United States Patent [19]

Putnam et al.

[11] Patent Number: 5,175,855
[45] Date of Patent: Dec. 29, 1992

[54] METHOD FOR COMMUNICATING INFORMATION BETWEEN INDEPENDENTLY LOADED, CONCURRENTLY EXECUTING PROCESSES

[75] Inventors: Frederick A. Putnam, Boxford; John G. Rhoads, Hamilton, both of Mass.

[73] Assignee: Laboratory Technologies Corporation, Wilmington, Mass.

[21] Appl. No.: 78,369

[22] Filed: Jul. 27, 1987

[51] Int. Cl.⁵ .............................................. G06F 1/00
[52] U.S. Cl. ................................ 395/700; 364/280.9; 364/284.2; 364/280; 364/281.3; 364/231.4; 364/231.6
[58] Field of Search ... 364/200 MS File, 900 MS File

[56] References Cited

U.S. PATENT DOCUMENTS

| | | | |
|---|---|---|---|
| 4,447,874 | 5/1984 | Bradley et al. | 364/200 |
| 4,511,964 | 4/1985 | Georg et al. | 364/200 |
| 4,658,351 | 4/1987 | Teng | 364/200 |
| 4,727,480 | 2/1988 | Albright et al. | 364/200 |
| 4,733,347 | 3/1988 | Fukuoka | 364/200 |
| 4,755,932 | 7/1988 | Diedrich | 364/200 |

Primary Examiner—Joseph A. Popek
Assistant Examiner—Rebecca L. Rudolph
Attorney, Agent, or Firm—Allegretti & Witcoff, Ltd.

[57] ABSTRACT

A subprogram which operates as a MS/PC-DOS device driver provides a communication path between a data acquisition program which operates as an interrupt driven memory-resident program in background and a conventional data analysis program which operates in foreground. Information transfers are initiated by the foreground program which issues standard I/O requests to the DOS, identifying the device driver and the information storage area within the foreground address space from which or to which the information is to be communicated. The device driver subprogram relays the information to the background process by calling the background program at an entry point which is made available to the device driver at a predetermined interrupt vector location, enabling the device driver to pass the memory address of the foreground storage area, together with the size of the block of information to be communicated, to the background program. The background program operates in a selected one of several possible modes, one of which waits for data to supplied from an external data acquisition instrument before returning control to the foreground process so that the two processes can operate in synchronism.

8 Claims, 1 Drawing Sheet

METHOD FOR COMMUNICATING INFORMATION BETWEEN INDEPENDENTLY LOADED, CONCURRENTLY EXECUTING PROCESSES

BRIEF SUMMARY OF THE INVENTION

This invention relates to electronic data processing and more particularly, although in its broader aspects not exclusively, to an improved method of data acquisition, process control, monitoring and data analysis.

It is a specific object of the present invention to make data gathered by data acquisition apparatus conveniently and immediately available to a wide variety of available data analysis and manipulation programs.

The present invention represents an improvement over a prior method of data acquisition which, although possessing significant advantages in other respects, utilized conventional methods for making the acquired data available to other programs. This prior system included a memory resident subsystem which executed in real time in "background" to acquire data and store it temporarily in a reserved portion of main memory, allowing the user of the system to perform other tasks using other programs during longer tests. This background data acquisition program was initially loaded and initialized, and then put into background, allowing the operating system to handle any further application program the user wished to execute. The data acquisition program remained resident in memory, however, and was thereafter periodically activated by interrupts to transfer the acquired data to the temporary storage area, each time yielding control to the concurrently executing "foreground" program after the individual transfer was completed. At some later time, when the user completed the task running in foreground, the acquisition program could be returned to foreground to process the data which had been accummulated in the interim.

In many instances, it was desireable to make the collected data available to one or more of the rich assortment of prewritten data analysis programs which users wished to employ to further analyze the collected data, such as spreadsheet, graphics, and statistical analysis programs. Accordingly, the acquisition program which formed part of the prior system included means for saving the acquired data as a standard operating system disk file. Since existing data analysis software is typically capable of processing data in such standard files, the desired additional processing could be accomplished without re-keying the collected data.

Nevertheless, this prior approach had notable shortcomings: First, as can be appreciated from the discussion above, before a conventional general purpose program could be run to process the collected data, the it was necessary to return to the data acquisition program to transfer that data from the temporary storage area in memory to a standard disk file. Secondly, and even more importantly, the analysis program could not analyze the data in "real time"; that is, to analyze the most currently available data by means of a conventional program, it was first necessary to exit the analysis program, transfer the most recently acquired data to a disk file using the data acquisition program, and then re-enter the analysis program. This latter constraint made it impossible to use typical general-purpose programs to perform realtime process monitoring functions and the like.

It is therefor a general object of the present invention to permit data being acquired, generated or used by an event-driven process operating in background to be communicated in real time to and from a second user process concurrently operating in foreground even though that second process is provided with no mechanism for communicating information other than by reading from and writing to standard operating system files and devices.

In accordance with a principal feature of the invention, communication between independently loaded and concurrently executing user programs is accomplished through the use of a memory resident device subprogram which is loaded and initialized when the system is booted. The first of the two user programs is thereafter loaded by the operating system and remains resident in memory while control is returned to the operating system so that, at a still later time, the second of the two user programs is loaded and begins execution. The second program (typically but not necessarily a conventional application program) initiates communication with the first by invoking the services of the operating system to read or write to a "virtual" device or file which is implemented by the device driver. The operating system presents the I/O command issued by the second user program to the device driver as an I/O request which specifies, among other things, the size and location of the data to be written in the case a write request, or the size and location of the memory zone to receive the data in the case of read request. The device driver then activates an appropriate interface routine in the first program by passing control to an entry point specified in a predetermined user interrupt vector location. The content of the initiating I/O request from the operating system is also passed to the first program so that it may determine the nature of the communication being requested by the second program and the destination (or source) of the information to be transferred.

From the standpoint of the user, this method of communication between the two independently loaded and concurrently executing programs provides a significant benefit in that a first memory resident program can be used to acquire, generate, monitor or reformat data, or perform process control functions in response to externally supplied data, and that same data can be concurrently manipulated and communicated in real time between the first program and any other program capable of reading from or writing to standard files or devices, including any general-purpose spreadsheet, graphics, monitoring, or data analysis program having conventional I/O capabilities.

In accordance with still another feature of the invention, the communication mechanism contemplated by the present invention allows the two concurrent processes to operate in synchronization. For example, if the background process is acquiring data from instrumentation, and this data is been communicated in real-time to the foreground process via the device driver mechanism in accordance with the invention, the interface routine in the background program can be programmed to wait until a requested item of data has been received and placed in temporary storage before yielding control back to the foreground process. This synchronization mechanism insures that the desired output which is presented to the foreground program is in fact based on "real time" (very recently acquired) data. Similarly, when the program running in foreground is performing process control functions by manipulating data acquired or generated by the background process and returning control information to the background process, the synchronization which this aspect of the invention makes possible insures that the control information being returned to the background process is always based on up-to-date acquired information.

These and other objects, features and advantages of the present invention may be more fully understood by considering the following detailed description of a specific embodiment of the invention. In the course of this description, reference will initially be made to the attached drawing, in which:

DETAILED DESCRIPTION

The specific arrangement to be described employs a conventional IBM-PC compatible computer utilizing the IBM PC-DOS or Microsoft MS-DOS operating system, or the equivalent. As will be discussed in more detail below, the operation of the invention requires that the operating system support installable device drivers of the type introduced into Version 2.0 of the PC/MS-DOS operating system, and later versions. Similar installable device drivers were employed even earlier in the UNIX/XENIX operating systems, and are also implemented in the operating system for the Apple Macintosh computer. A general description of both PC/MS-DOS and UNIX/XENIX installable device drivers may be found in an article entitled "16-BIT SOFTWARE TOOLBOX" by Ray Duncan which appeared in the July 1985 issue of *Dr. Dobb's Journal*, pp. 94–109. More recent and more detailed explanations of the PC/MS-DOS device drivers are contained in further references cited later in this description. The "Device Manager" in the Macintosh operation system is described in *Inside Macintosh*, Volume II, Chapter 6, pp II-187–208, Addeson-Wesley Publishing Co. Inc. (1985). In the present specification, the term "operating system" will be employed to refer generally to operating systems of this class. Similarly, the term "device driver" is intended to refer to not only the specific PC/MS-DOS device drivers to be discussed in more detail below, but also to their functional equivalents implemented in other operating systems.

In the specific embodiment to be described, the interprogram communication mechanism contemplated by the present invention is used to pass information between two independently loaded and concurrently executing programs, the first of which is a data acquisition and control program which operates in background and the second of which is a conventional user program capable of performing only standard DOS I/O procedures.

Figure 1:
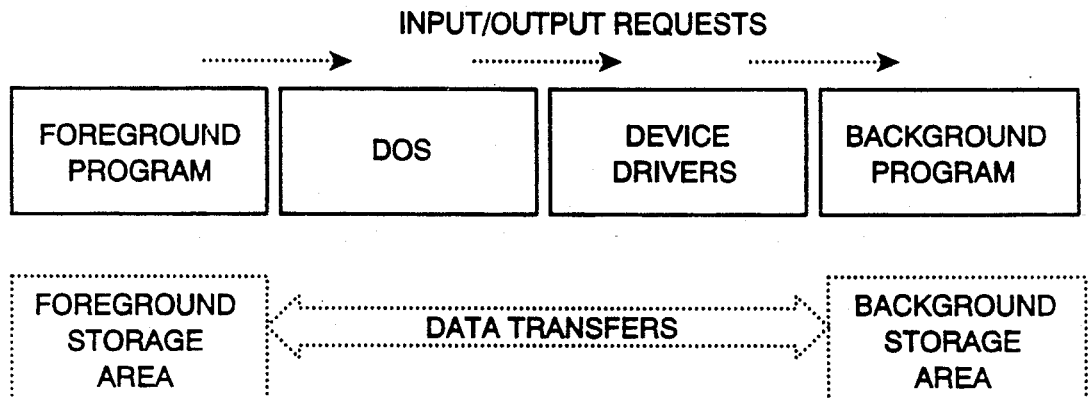
FIG. 1 is a block diagram showing the basic flow of control and data as contemplated by the present invention.

FIG. 1 of the drawings introduces the general approach used. The foreground program seen at 3 initiates the communication at any desired time by issuing a read or write request to DOS routines seen at 4, identifying a "device" which it wishes to read from or write to, and further specifying the location of a foreground storage area 7 (that is, a main memory address within the address space used by the foreground program 3 which contains (or will contain) the data to be communicated with the background storage area 8 within the address space used by the background program 6.

Actually, there is no physical device as such, but there is a "virtual device" in the form a device driver subprogram seen at 5 to which DOS passes the communication request. The device driver 5 is specially written code (to be described) which in turn passes the communication request to the background process 6 by temporarily passing control to a specially written data transfer routine in the background program 6. This routine moves the requested data between the two storage areas 7 and 8, and then yields control back to the foreground program 3, which "thinks" it has read the requested data from a conventional device or file in the conventional way.

Figure 2:
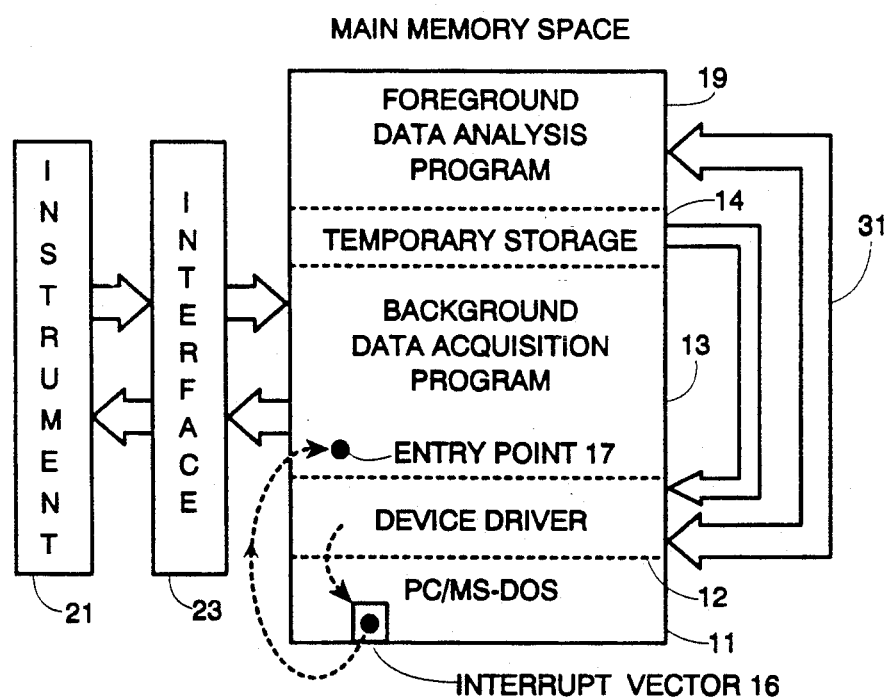
FIG. 2 is a block diagram which depicts in more detail the principle information flow paths and the utilization of main memory address space as employed in the specific embodiment of the invention to be described.

As seen in FIG. 2 of the drawings, at the time the inter-program communication takes place, random access memory space is allocated by the operating system to five zones of interest. These five zones of memory space are allocated in sequence from the bottom up as discussed below.

The PC/MS-DOS operating system itself includes a number of resident processes whose services are utilized (as will be discussed) to perform the subject inter-program communication and the resident portion of DOS which includes these routines is loaded first when the system is initialized and occupies the lowest address space as indicated at 11 in the FIG. 2.

Next, after DOS has been loaded, it processes a disk file called CONFIG.SYS which may identify, among other things, one or more installable device drivers. A device driver is an executable code module, an example of which is loaded into the memory zone seen at 12 in the drawing and initialized at system boot time after DOS has been loaded.

Thereafter, a first user program which performs data acquisition and reformatting functions is loaded in into the third zone seen at 13 in FIG. 2. This program runs in background concurrently with other user programs (to be discussed) and stores data obtained from an external instrument 21 via an instrument interface 23 in a temporary storage area of memory seen at 14 in the drawing, the memory area 14 being allocated by DOS as part of the address space visible to and used by the background program when that program is loaded into zone 13.

After the background program is loaded, it executes an initialization routine which moves a pointer to a predetermined absolute memory location such as the predetermined user interrupt vector location seen at 16 in FIG. 2. The pointer value loaded into vector location 16 specifies the entry point 17 within the program in zone 13 for a communication interrupt handling routine which is invoked by the device driver in a manner to be discussed. With this initialization accomplished, the background program at 13 returns control to the DOS command processor so that other user programs can be run concurrently with the data gathering operation of the background program (which is periodically activated by a clocked interrupt or an external attention requesting interrupt from the interface 23).

Finally, the user then loads and begins execution of the foreground program which occupies zone 19 of the main memory space. As seen in the drawing at 31, the foreground program at 19 reads and writes information via the installed device driver at 12 which in turn invokes the communication interrupt handling routine in background program at entry point 17 via the interrupt vector at location 16. The device driver also passes the destination (or source) address of the data to be communicated (as known to the foreground program) as a parameter to the background program which then effects the transfer which, in the example shown in FIG. 2, illustratively takes the form a data move from the data storage area 14 to a destination area specified in the initial I/O request supplied to the device driver at 12 by the standard I/O request issued to the driver by DOS in response to the I/O command issued by the foreground program at 19.

THE DEVICE DRIVER

Communication between the concurrently operating foreground and background programs is achieved via a subprogram called a "device driver" which adheres to a predetermined format and which is preloaded into memory at the time the system is initialized.

Device driver subprograms, as their name implies, are normally used in the PC/MS-DOS operating system to provide an interface between the operating system and special hardware devices, normally providing input/output functions between application programs, which call operating system routines to perform input/output functions, and the physical devices, which are written to and read from via the special code contained in the device driver.

Generally, the manufacturer of the physical device provides the end user with the special purpose software, in the form of a device driver, which enables the hardware to operate successfully as an integral part of the system. Devices which are customarily supplied with installable device drivers include auxiliary disk drives, digitizers, scanners, hand-held mouse and light-pen devices, and so on.

Programs operating as device drivers have also been developed which support devices that don't actually exist. The most commonly used of these "virtual device drivers" is the RAM-disk, which behaves (as far as the application program using it is concerned) exactly like a physical disk memory device, but which actually stores data in random-access memory rather than on a magnetic disk.

In accordance with an important feature of the present invention, the device driver can also provide a means of communicating information between a data acquisition program operating in "background" and an application program operating in "foreground" without requiring that the application include any special interface other that standard operating system file-handling procedures.

The coding format of the device driver subprogram is dictated by the operating system itself. The PC/MS-DOS operating system's requirements for the makeup of a operable device driver are set forth in *Disk Operating System Technical Reference*, International Business Machines Corp., Boca Raton, FL (1984,85 for DOS 3.1); in *Microsoft MS-DOS Programmer's Reference*, Microsoft Corporation, Bellvue, WA (1983); and in MS-DOS *Developer's Guide*, Chapter 5 "Installable Device Drivers", by John Angermeyer and Kevin Jaeger, Howard W. Sams & Co., Indianapolis, IN (1986).

The assembly language code for a device driver developed to implement the present invention is set forth below with comments and explanation added to assist the reader. It is assumed that the reader already has an understanding of assembly language programming as well as the requirements for installable device drivers imposed by the operating system and set forth in the references noted above.

```
--- DEVICE DRIVER ASSEMBLY LANGUAGE LISTING ---
;------------------------------
cr         equ      0dh
lf         equ      0ah
eom        equ      'S'
user_int   equ      61h
vectors    segment  at 0H
org        user_int*
user_int_offset dw ?
user_int_segment dw ?
vectors    Ends
code       segment  public 'code'
driver     proc     far
assume     cs:code,ds:code,es:code
org        0
max_cmd    equ      12 ;driver command code max: 15 for dos 3.x
;
; DEVICE DRIVER HEADER
;
header  dd      -1 ; link to next device
dw      8000h   ; attribute word. bit 15=1
                  for character device
dw      Strat   ; "strategy" entry point
dw      intr    ; "interrupt" entry point
db      'rta '  ; device name
;
; LOCAL VARS FOR DRIVER
;
rh_ptr    dd ?           ; request header pointer
Channel   dw 0           ; channel (buffer number) for request
ident     db cr.lf.lf
db        'notebook rta device driver v.100'
db        cr.lf.lf.eom
chk_str   db 'Srid'
even
```

-continued

```
save_ss     dw    3412h
save_sp     dw    0aa5h
istack      db    512 dup("stk")
topstk      dw    0
astack      dw    topstk
marker      db    '0123456789'
```

; DRIVER COMMAND CODES DISPATCH TABLE

```
dispatch:
dw  inti       ; 0  = init driver
dw  media_chk  ; 1  = media check on block device
dw  build_bpb  ; 2  = build bios parameter block
dw  ioctl_inp  ; 3  = control read from device
dw  input      ; 4  = normal destructive read
dw  nd_input   ; 5  = non-destructive read, no wait
dw  inp_stat   ; 6  = return current input status
dw  inp_flush  ; 7  = flush device input buffers
dw  output     ; 8  = normal output to device
dw  output_vfy ; 9  = output with verify
dw  outp_stat  ; 10 = return current output status
dw  outp_flush ; 11 = flush output buffers
dw  ioctl_outp ; 12 = i/o control output
dw  dev_open   ; 13 = device open (dos 3.x)
dw  Dev_close  ; 14 = device close (dos 3.x)
dw  Rem_medial ; 15 = removeable media (dos 3.x)
```

; STRUCTURE DEFINITION FOR REQUEST HEADER

```
request     struc
rlength     db    ?
Unit        db    ?
Command     db    ?
Status      dw    ?
Reserve     db    8 dup(?)
Media       db    ?
Address     dd    ?
Count       dw    ?
Sector      dw    ?
Request ends
```

; STRATEGY ROUTINE
;
; gets rh address in es:bx and saves it
;
```
strat   proc  far
mov     word ptr cs:[rh_ptr],bx
mov     word ptr cs:[rh_ptr-2],es
ret
strat   endp
```

; INTERRUPT ROUTINE
;
; dispatches to appropriate routine according to command code in
; request header. Command code routines responsible for setting
; up routine and passing control to error or exit as appropriate
;
```
intr    proc        far
push    ax                      ; save as in caller's stack
mov     cs:save_sp,sp
mov     cs:save_ss,ss
mov     ax,cs
mov     ss,ax
mov     sp,astack
push    bx                      ; save remaining regs in our stack
push    cx
push    dx
push    ds
push    es
push    di
push    si
push    bp
push    cs                      ; set up local addressing
pop     ds
les     di,[rh_ptr]; es:di = request header
mov     bl,es:[di.Command]
xor     bh,bh
; copy the command to ah (like a function number)
mov     ah,bl
xor     al,al
cmp     bx,max_cmd; check for code out of range
jg      unk_command
```

```
        shl     bx,1    ;set up to dispatch
        jmp     word ptr[bx+dispatch]
; exits from driver
unk_command:
        mov     al,3    ; set unknown command and done bits
error:
        mov     ah,8ah  ; come here with al=error code--sets
                        ; error and done bits
        jmp     exit
done:
        mov     ah,1    ; no error,set done bit only
exit:
; general purpose exit routine - enter
; with ax = returnstatus word for
; request header
        lds     bx,cs:[rh_ptr]
        mov     ds:[bx.Status],ax
        pop     bp
        pop     si
        pop     di
        pop     es
        pop     ds
        pop     dx
        pop     cx
        pop     bx
        mov     ss,save_ss
        mov     sp,save_sp
        pop     ax
        ret
;
media_chk:   ; 1 = media check on block device
build_bpb:   ; 2 = build bios parameter block
ioctl_inp:   ; 3 = control read from device
;-----------------------------
; NORMAL READ FROM NOTEBOOK USER READ
ROUTINE
;-----------------------------
input:         ; 4 = normal destructive read
nd_input:      ; 5 = non-destructive read, no wait
inp_stat:      ; 6 = return current input status
inp_flush:     ; 7 = flush device input buffers
output:        ; 8 = normal output to device
output_vfy:    ; 9 = output with verify
outp_stat:     ; 10 = return current output status
outp_flush:    ; 11 = flush output buffers
ioctl_outp:    ; 12 = i/o control output
dev_open:      ; 13 = device open (dos 3.x)
Dev_close:     ; 14 = device clos (dos 3.x)
Rem_media:     ; 15 = removable media (dos 3.x)
;-----------------------------
; CHECK FOR VALID USER INTERRUPT POINTED TO
NOTEBOOK
; tests for signature bytes 'Srid' six bytes before
; the interrupt entry point
;-----------------------------
        push    ax
        push    di
        push    es
        mov     ax,0
        mov     es,ax
        assume  es:vectors
        mov     di,user_int_offset
        mov     ax,user_int_segment
        mov     es,ax
        assume  es:nothing
        sub     di,6
        mov     si,offset chk_str
        cld
        mov     cx,4    ; compare 4 bytes
cmp_str:
        cmpsb
        loope   cmp_str
        jnz     no_marker; signature bytes not found
;-----------------------------
; PASS REQUEST ON TO NOTEBOOK CODE
;-----------------------------
        pop     ex
        pop     di
        pop     ax
        push    ds
;-----------------------------
; invoke user read interrupt code in notebook
```

-continued

```
; enter with function number in ah, request header address in es:di
; assume ax is status to be put in request header
;--------------------------------
int          user_int
pop          ds
jmp          exit
no_marker:
pop          es
pop          di
pop          ax
mov          al,0ch ; signal general failure error
jmp          error ; INITIALIZATION.
; This code called only once, when driver is loaded.
; It frees its own memory to dos when it is finished. Initialization
; code may only use dos functions 01-0ch and 30h.
;
Init: ; function 0 = initialize driver
push         es             ; push request header address
push         di
mov          ah,9           ; print sign-on message
mov          dx,offset ident
int          21h
pop          di
pop          es             ; restore request header address
                            ; set first useable memory address
mov          word ptr es:[di.Address],offset init
mov          word ptr es:[di.Address-2],cs
jmp          done
intr         endp
driver       endp
code         ends
end
--- END OF DEVICE DRIVER ASSEMLY LANGUAGE
LISTING ---
```

The device driver as listed above functions as follows to enable a conventional program to communicate with the data acquisition program running in background.

First, it should be noted that the DEVICE DRIVER HEADER as well as the STRATEGY ROUTINE and the INTERRUPT ROUTINE are mandatory parts of any installable device driver. The DEVICE DRIVER HEADER includes an ATTRIBUTE WORD which, as seen in the listing above, has been set to contain all zero's, except for bit 15, which is set to equal "1". DOS interprets this attribute word to mean that the device driver is a "character" (as opposed to a "block" device), that I/O Device Control is not used, nor are OPEN/-CLOSE/REMOVABLE MEDIA calls. In addition, the ATTRIBUTE WORD 8000 Hex further indicates to DOS that this particular device driver does not have special attributes and is neither a CLOCK, NUL, nor STANDARD INPUT OR OUTPUT device. Although, as will be apparent to those skilled in the art, the device driver could be expanded to have even greater functionality, particularly by adding support for I/O Control (IOCTL) functions accessed via DOS function call 44h, most existing application programs are incapable of using IOCTL; accordingly, this additional capability has been intentionally omitted from the preferred form of device driver listed above.

To initiate communication via a device driver, DOS passes a pointer to a data structure called the DRIVER REQUEST HEADER BLOCK which DOS builds to invoke the services of the driver. The pointer is passed in the ES:BX register pair to the STRATEGY ROUTINE, a FAR procedure, which saves it within its own code segment at RH_PTR and returns control to DOS.

DOS then calls the INTERRUPT ROUTINE, another FAR procedure, which performs the operation requested in the DRIVER HEADER REQUEST BLOCK. The INTERRUPT ROUTINE saves all registers, checks the command code (the third byte contained in the DRIVER REQUEST HEADER BLOCK as seen in the STRUCTURE DEFINITION FOR REQUEST HEADER) to insure that it is valid (less than or equal to MAX_CMD, which is set to 12 in the listing above), and then branches to one of the routines whose address is contained in the DRIVER COMMAND CODES DISPATCH TABLE. This dispatch table represents a list of the 16 standard I/O commands which DOS uses to request services from any device driver.

As seen from the assembly language listing for the driver, the dispatch table generates a branch to the same location for all commands except the first, INIT, a command which DOS issues only once, when the driver is first loaded by the system at boot time as a result of its being identified in the DOS configuration file CONFIG.SYS. This initial load is requested by the user by including a line in the file CONFIG.SYS (a DOS text file) having the form "DEVICE=RTA.SYS" where "RTA.SYS" is the DOS filename of the assembled and linked device driver code file.

As seen in the device driver source listing above, the INIT routine uses INT 21h to display a "sign-on" message on the system's standard output device (usually the CRT screen) to indicate to the user that this particular device driver is being loaded and initialized. The request header address is then restored and the first useable memory address (break address) is set to the starting address of the INIT routine which, although it must be present in the device driver, will no longer be needed during the resident life of the driver once it has been initialized, and may hence be overwritten. The INIT routine concludes by branching to DONE which sets the appropriate status code into the AX register for handling by the general purpose exit routine EXIT. EXIT restores the general registers and concludes with a FAR return to the DOS process responsible for loading the device drivers listed in the CONFIG.SYS file.

Thereafter, the device driver code is called by DOS to provide communication between an application program running in foreground and the data acquisition program running in background. This accomplished by the DISPATCH TABLE branch for all DOS command codes (other than INIT) to a common routine which simply transfers control to the resident data acquisition program at an entry point stored in a predetermined interrupt vector location (user interrupt vector location 61h in the example driver) which was previously set when the run time library acquisition program was loaded and initialized. Before passing control to the run time library code, however, the device driver does a validity check to insure that the needed code has indeed been properly loaded and initialized. It does this by checking a predetermined location in the run time library code (six bytes before the interrupt entry point) for a set of signature bytes CHK_STR having the value 'Srid'.

If the signature check is valid, the run time library code is invoked by INT USER_INT which is entered with the function humber in the AH register and the REQUEST HEADER address in the register pair ES:DI. The correct address of the entry point of the interface routise is installed by an initialization routine in the data acquisition program which uses the standard DOS function 25h (SET INTERRUPT VECTOR) to install the user interrupt.

The installed interrupt vector points to code which, in the illustrative example, is an assembly language routine which provides a more convenient interface so that the data acquisition routines may be written in the high-level language C. As an illustration, the assembly language listing below defines the code at the interrupt handler entry point, together with certain additional data structures including the "signature bytes" noted earlier, as follows:

```
--- RTL INTERRUPT HANDLING INTERFACE CODE
        IN ASSEMBLY LANGUAGE ---
;   prologue/epilogue for interrupt handler written in C.
;   assumptions: interrupt is issued from Lattice C large
    model code - we
;   need to preserve only bp, ds, and es
    include ltn.mac
extrn   bufrd_int:far
    PSEG
;-----------------------------------------------------------
;   Data structures per Microsoft memory-resident standard
;-----------------------------------------------------------
prog_id db  "PIDR"
    dw    0003h  ; BCD version number, 3.00
int_list_ptr dw offset int_list
    dw    0     ; startup shift keys
    dw    0     ; startup key codes
    dw    0     ; option area
    db    "LABTECH (R) RTA Notebook",0
int_list db 08h,61h,0   ; list of interrupts used
user_int_record dd  0   ; space for down-pointer
    dw    offset prog_id  ; ptr to program id record
    db    192   ; priority
    db    1,2,3,4,5,6,7,8,0  ; function numbers
;-----------------------------------------------------------
;   signature bytes for driver to check
;-----------------------------------------------------------
    db    "Srid"
    dw    offset user_int_record
;-----------------------------------------------------------
;   gotint - user read interrupt entry
```

```
;   on entry:
;       AH integer function number
;       (AL don't care)
;       ES:DI pointer to request header
;-----------------------------------------------------------
    BEGIN       gotint
; set our data segment
    push ds
    push ax
    mov ax,DGROUP
    mov ds,ax
    pop ax
;   make function number in ah into a regular integer
    for C language
    mov al,ah
    xor ah,ah
    sti
    mov bp,sp
;   arrange arguments to bufrd_int in stack
    push es
    push di
    push ax
    cld
    call    bufrd_int
;   drop arguments from stack
    mov sp,bp
    cli
;   restore from caller's stack
    pop ds
    iret
gotint  endp
    ENDPS
    END
--- END OF RTL INTERRUPT HANDLING
    INTERFACE ASSEMBLY LISTING ---
```

As seen from the listing above and the prior discussion, at the entry point GOINT the AH register contains the function number and the ES:DI register pair contain the pointer to the REQUEST HEADER. The assembly language routine sets the data segment, converts the function number in the AH register into conventional C language integer format, puts the arguments to be passed to the background process in the stack, and makes a FAR call to the procedure BUFRD_INT, the portion of the background program which handles data communications via the device driver. That procedure as written in C is listed below:

```
--- C LANGUAGE LISTING OF BUFRD_INT
            FUNCTION ---
/*  structure used for holding characters preparatory to output
    from the program */
*define MAX_HB_SIZE 512
struct hold_struct
    {
    /* intermediate hold buffer */
    int rent;
    char *rptr;
    char *ptr;
    char *wptr;
    char hold_buffer[MAX_HB_SIZE];
    }
struct hold_struct h_data;
/*-----------------------------------------------------------
 * bufrd_int - C function called from foreground using
 *   software interrupt
 *       via gotint.asm interrupt catcher
 *-----------------------------------------------------------
 */
#define STATUS_DONE 0x0100
#define STATUS_ERROR 0x8000
#define STATUS_READ_FAULT 0x800a
/* ASCII ctl-Z end of file character */
#define EOF_CHAR 0x1a
/* variables to copy request header values into */
char rh_cmd;
```

-continued

```
unsigned rh_status;
char *rh_transfer_ptr;
unsigned rh_count;
/* macro that can be used as an lvalue to set the count
   in the request header */
#define RH_COUNT (*((unsigned *)(rh_ptr + 0x12)))
unsigned
bufrd_int(function, rh_ptr)
    int function;
    char *rh_ptr;
    {
    struct hold_struct *h = &hdata;
    int c;
    int length = 0;   /* number of bytes put in caller's buffer */
    int went;         /*bytes remaining in caller'buffer */
    char *wptr;       /* pointer for writing to user buffer*/
    unsigned status = 0;
    rh_cmd = *(rh_ptr + 2);
    rh_status = *((unsigned *)(rh_ptr + 3));
    rh_transfer_ptr = *((char **)(rh_ptr + 0x0e));
    rh_count = *((unsigned *)(rh_ptr + 0x12));
    switch (function)
    {
    /* write request */
    case 8:
        buffer_command(rh_count, rh_transfer_ptr);
        break;
    /* read request */
    case 4:
        /* set write count and write pointer for
           writing to user buffer */
        went = rh_count;
        wptr = rh_transfer_ptr;
        while(--went > =0)
        {
            if(--h->rent > =0)
                c = *h->ptr--;
            else
                c = fill_hold(h);
            if(c = = ERROR)
            {
                c = EOF_CHAR;
                break;
            }
            *wptr-- = c;
            length--;
        }
        status = STATUS_DONE;
        RH_COUNT = length;
        break;
    default:
        break;
    }
    return (status);
}
--- END OF C LANGUAGE BUFRD_INT
FUNCTION LISTING ---
```

As seen above, the device command number (expressed as the integer FUNCTION) and a pointer to the header (expressed as RH_PTR) are passed to BUFRD_INT. If the value of the device command was 8 indicating a request by DOS to write to the virtual device, BUFRD_INT invokes the procedure BUFFER_COMMAND, passing to it the number of bytes to be transferred RH_COUNT and the address of the buffer area in memory containing these bytes RH_TRANSFER_PTR, both of these values being obtained from the ADDRESS and COUNT fields of the REQUEST HEADER supplied by DOS (see the STRUCTURE DEFINITION FOR REQUEST HEADER in the assembly language listing of the device driver code). The procedure BUFFER_COMMAND can perform whatever operation is indicated by the I/O request received from the foreground program.

Information is transferred from the background program to the foreground program in response to a device command having the value 4, indicating a DOS input (read) operation. In that event, the procedure BUFRD_INT listed above transfers up to RH_COUNT bytes in the data holding area HDATA.HOLD_BUFFER (which is loaded by means of conventional data acquisition methods as represented by the function FILL_HOLD, the details of which are not described in this specification) to the destination in the address space of the foreground program as specified by the pointer RH_TRANSFER_PTR supplied by DOS. It may be noted that, if BUFRD_INT encounters an error condition or the end of the available data before transferring RH_COUNT bytes (as indicated by a data byte value=ERROR as set by the background program), a DOS end-of file character CONTROL-Z is placed in the transfer buffer and the BUFRD_INT terminates.

In accordance with the invention, an interface procedure of the type illustrated by BUFRD_INT may be programmed to operate in a selected one of several modes of operation, and the device driver interface may be used to send commands from the foreground program to the background program selecting any of these modes. In one mode, all data accumulated in the data holding area HDATA.HOLD_BUFFER since the last read request may be passed to the foreground program, assuring that no data will be skipped. In another mode, only the latest data point in the holding area is passed to the foreground program. Yet another command requests the transfer of a new data point regardless of when the last one had been collected and put in the holding area. Reading can also be set to return with no data if none has been collected since the last read command, or to wait for data to be entered from the external instrument. This last "wait for data" mode provides a simple way for the foreground program to synchronize itself to the data acquistion rate (or some other event or events known to the background program).

As may be appreciated from the foregoing, the present invention provides a mechanism for constructing a variety of memory resident programs which can run in background to acquire data or perform other functions, and which can provide data and control information to, or receive data and/or control information from application programs running in foreground, and/or which can synchronize the operation of the foreground program to events known to the background program, even though those programs have no means of communicating other that via standard DOS files and devices.

It is to be understood that the specific arrangement which has been described is merely illustrative of one application of the principles of the invention and that numerous modifications may be made by those skilled in the art without departing from the true spirit and scope of the invention.

What is claimed is:

1. The method of communicating between background and foreground processes which operate on data stored within background and foreground regions respectively of a random access memory, said background and foreground processes being independently loaded by and concurrently executed under the supervisory control of an operating system which implements installable device drivers, said method comprising, in combination, the steps of:

requesting the operating system to load a special-purpose installable device driver into memory, said device driver being adapted to relay an I/O request from said operating system to an interface routine located at an entry point address, the value of said entry point address being stored at a predetermined memory location, requesting the operating system to load a background program into memory for carrying out said background process, said background program including said interface routine which comprises instructions for transferring information between said background region and said foreground region, the location of said foreground region being specified by a transfer address contained in said I/O request relayed to said background process via said device driver from said operating system, determining the run-time address of the entry point of said interface routine as loaded by said operating system and storing said run-time address in said predetermined memory location, and requesting the operating system to load a foreground program in said memory for carrying out said foreground process, said foreground program including a routine which supplies an I/O request to said operating system, said I/O request containing information identifying said special-purpose device driver and further specifying said tranfer address.

2. The method of communicating set forth in claim 1 wherein said special-purpose device driver relays said I/O request to said background process by passing control over the instruction execution sequence from the operating system to the instruction stored at the entry point specified by the run-time address stored at said predetermined memory location.

3. The method of communicating set forth in claims 1 or 2 wherein said background program further comprises instructions for placing data acquired from an external peripheral instrument into said background region of said random access memory.

4. The method of communicating set forth in claim 3 wherein said interface routine includes instructions for returning control to said foreground process only after a data item requested in a pending I/O request has been received from said external peripheral instrument and placed in said background storage location.

5. In a data processing system employing a memory and an operating system program, a method for transferring information between concurrently executing background and foreground programs which comprises. in combination, the steps of requesting the operating system to install a special-purpose device driver routine which is adapted to call an interface procedure, the first instruction of which is located at an run-time entry point address specified by the contents of a predetermined memory location, requesting the operating system to load said background program into memory and to begin executing said background program, said background program comprising instructions for performing said interface procedure and further comprising, in combination, instructions for determining the said run-time entry point address of said interface routine as loaded by the operating system and for storing said run-time address in said predetermined memory location, instructions for processing information stored in a background memory region, and an instruction for returning control to said operating system leaving said background program loaded in memory, requesting the operating system to load said foreground program into main memory for processing information stored in a foreground memory region, said foreground program including instructions for issuing input-output requests for the transfer of information between said background and foreground memory regions.

6. A method for transferring information as set forth in claim 5 wherein said background program is an interrupt-driven data acquisition routine for storing data from an external peripheral data collection device in said background region.

7. A method as set forth in claim 6 wherein said interface routine awaits the receipt of at least one data item from said collection device before returning control to said foreground program to thereby synchronize the execution of said foreground and background programs.

8. A method as set forth in claims 6 or 7 wherein said data acquisition routine is called at intervals by a hardware-generated clock interrupt.

* * * * *